July 25, 1961     J. P. BLACKWELL     2,993,648
JET PROPELLED SPRAYING DEVICE
Filed Jan. 5, 1959
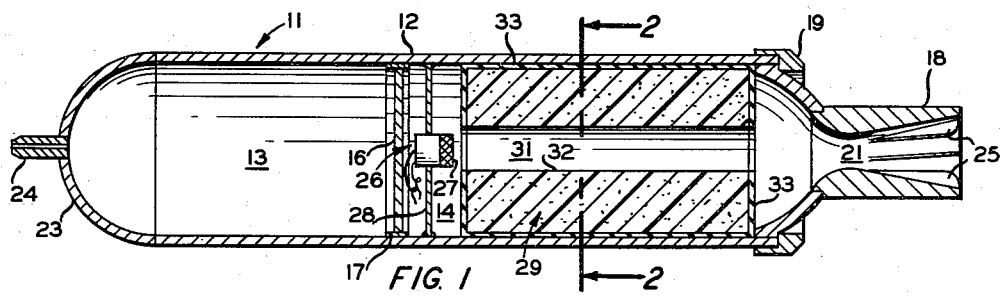
FIG. 1
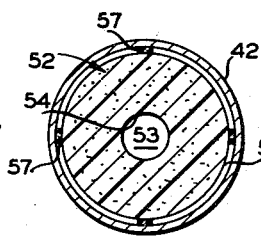
FIG. 4
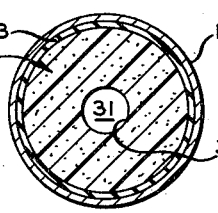
FIG. 5
FIG. 2
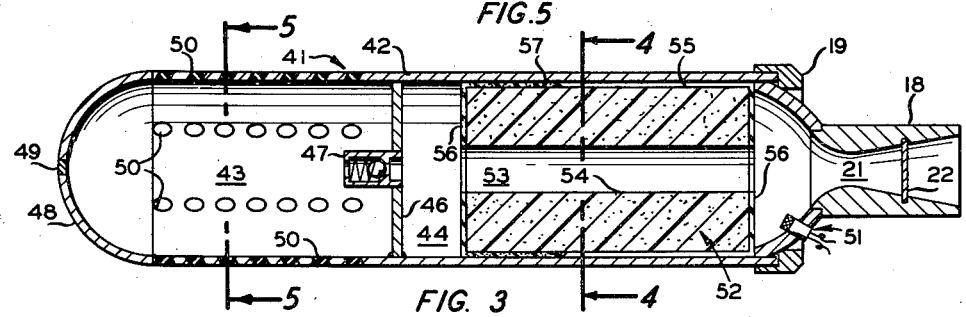
FIG. 3
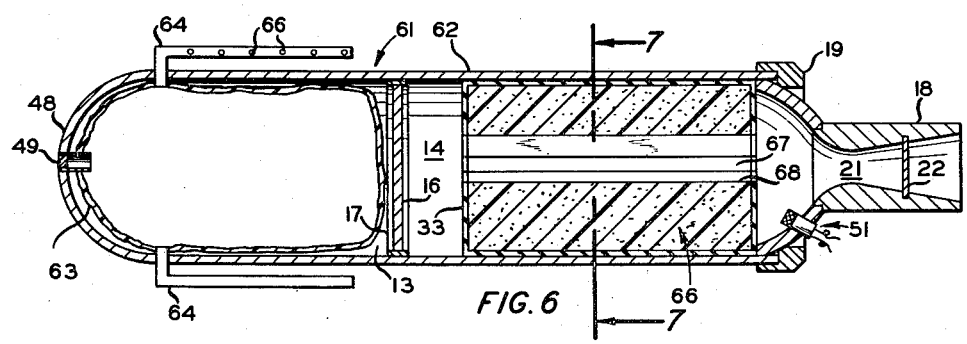
FIG. 6
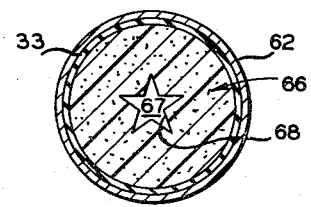
FIG. 7
*INVENTOR.*
J. P. BLACKWELL
BY *Hudson & Young*
ATTORNEYS

United States Patent Office 2,993,648
Patented July 25, 1961

2,993,648
JET PROPELLED SPRAYING DEVICE
Jennings P. Blackwell, Bartlesville, Okla., assignor to Phillips Petroleum Company, a corporation of Delaware
Filed Jan. 5, 1959, Ser. No. 784,998
14 Claims. (Cl. 239—1)

This invention relates to a novel jet propelled spraying device. In one aspect, it relates to an improved method of aerial spraying agricultural crops, foliage, farm land, and the like with a sprayable agricultural treating agent, such as insecticides, fertilizers, and the like.

In recent years, manned aircraft has been employed to spray crops, such as cotton, potatoes, peanuts, trees, foliage, farm lands, and the like, with agricultural treating agents or chemicals. However, there are many drawbacks or disadvantages in this type of application of agricultural treating agents. Very often the proper application of the agricultural treating agent is contingent upon the skill of the pilot. Then, too, the application of the treating agent by this method is restricted to daytime operation when visability is good. At best, this manner of applying agricultural treating agents is hazardous and requires considerable investment in equipment.

The instant invention overcomes to a great extent the foregoing disadvantages of aerial spraying agricultural treating agents and has among its objects the following:

An object of this invention is to provide a novel method of spraying agricultural crops, foliage, farm land, and the like with agricultural treating agents or chemicals, such as insecticides, fungicides, fertilizers, and the like. Another object is to provide a novel jet propelled spraying device. Another object is to provide an improved method of spraying agricultural crops, foliage, farm land, and the like which results in the economical, safe, and widespread aerial application of agricultural treating compositions or chemicals. Further objects and advantages of this invention will become apparent to those skilled in the art from the following discussion, appended claims, and accompanying drawing in which:

FIGURES 1, 3, and 6 are side elevational views in partial section of various embodiments of the novel jet propelled spraying devices of this invention; and FIGURES 2, 4, 5, and 7 are cross-sectional views of FIGURES 1, 3, and 6, taken along the planes indicated.

Referring now to the drawing, in which like parts have been designated with like reference numbers, and initially to FIGURES 1 and 2, one embodiment of the jet propelled spraying device of this invention is illustrated and generally designated 11. Spraying device 11, hereinafter termed "gas generator," comprises a cylindrical casing 12, made of metal or the like, which defines in part two separate compartments, a liquid-tight compartment 13, which is adapted to contain a fluid sprayable agricultural treating agent or chemical, and a propulsion reaction chamber or combustion chamber 14. These two compartments are divided by a movable piston 16, the peripheral portion of which is secured to a ring 17 which is in sealing engagement with casing 12 and is slidably movable along the same. The aft end of casing 11 is reduced and has an axial opening in which is threaded or otherwise secured a reaction nozzle 18, which can be held in position by a suitable locking ring 19. Nozzle 18 is of the De Laval type having an axial converging-diverging passage 21 which communicates at its inlet end with combustion chamber 14. A plurality of vanes 25, made of metal, graphite, or the like, are positioned within nozzle passage 21, the vanes being longitudinally disposed within passage 21 at an angle with respect to the longitudinal axis of the gas generator so that when the gases are exhausted from chamber 14 through passage 21, the gases impinge on these vanes and cause the generator to rotate. Alternatively, such vanes can be mounted on the outside of nozzle 18, and additional openings provided in the aft end of casing 12 so as to cause gases from chamber 14 to similarly impinge on the external vanes. The head end of the gas generator 11 is closed by means of a suitable closure member 23 which can be threadedly secured or otherwise affixed to the head end of the casing, thereby sealing the head end of fluid-tight compartment 13. Head closure member 23 can be provided with one or more spraying nozzles 24 which are adapted to release or spray the agricultural treating agent within compartment 13 upon movement of piston 16 toward the head end of the gas generator. These nozzles 24 are capped or otherwise normally closed after filling compartment 13 and opened, for example by rupturing the nozzle cap, when a predetermined pressure is internally exerted thereupon. Adjacent the head end of combustion chamber 14, near piston 16, is an axially supported igniter device 26 having a frangible container 27, made of wire mesh or the like, this frangible container adapted to be filled with black powder or other pyrotechnic material. Igniter device 26 can be supported within combustion chamber 14 by suitable means, such as the spider 28 shown in the drawing, which spider is provided with radiating arms that are welded or otherwise secured at the outer extremities to casing 11. Alternatively, igniter device 26 can be secured to piston 16. Suitable electro-responsive means, such as squibs, fuses, matches, or the like, are in contact with the ignition material within igniter cup 27 and are adapted to be connected to an electrical system in an external power source, such as a battery. A solid propellant charge 29 is loaded or mounted within combustion chamber 14. The particular propellant charge 29 shown in the drawing is cylindrical in shape and has an axial perforation 31 extending the length thereof, this perforation having a circular cross section and being defined by an exposed burning surface 32. The outer cylindrical surface and the two ends of the propellant material making up charge 29 are covered with suitable restricting material 33, such as rubber, which restricting material is relatively noncombustible or has a burning rate substantially slower than that of the propellant material making up the charge. By so restricting propellant charge 29, the initial ignition and burning of the charge takes place on the exposed burning surface 32.

Referring now to FIGURES 3, 4, and 5 another embodiment of the gas generator of this invention is illustrated and generally designated 41. Casing 42 is divided by stationary partition 46 into two compartments, a sprayable agricultural treating agent compartment 43 and a combustion chamber 44. The head end of casing 42 is sealed or closed by a suitable closure member 48 which may be separable from or integral with the casing. This closure member is provided with one or more filler plugs 49 which can be inserted after filling compartment 43 with the desired agricultural treating agent. The other end of compartment 43 is closed by partition 46 having a check valve 47 or the like therein which prevents the agricultural chemical in compartment 43 from flowing in combustion chamber 44, but allows combustion gases from the latter to flow into compartment 43. The head end of casing 42 is also provided with a plurality of circumferentially spaced canted orifices or spray nozzles 50, which are inclined at an angle with respect to the radius of the gas generator and may be rearwardly inclined as shown in the drawing, so that when the agricultural treating agent is forced or sprayed out of orifices 50 by the introduction of combustion gases from combustion chamber 44 via check valve 47, the flow of the agricultural treating agent through these orifices imparts a rotation or spin to the gas generator, thereby aiding the widespread distribution or application of the agricultural treating agent while the gas generator is in flight. These orifices are normally closed or capped with any suitable material, such as paraffin, rubber, plastic, or the like, which material can be adapted to fail, and thus cause the orifices to open, when a predetermined pressure is attained within compartment 43. The orifices can have any dimensional configuration, such as tapered, etc. Alternatively, the rotation of gas generator 42 can be supplemented or effected instead by any other device known in the art; for example, as in FIGURE 1, a plurality of vanes or fins can be inserted within nozzle passage 21 at an angle with respect to the longitudinal axis of the gas generator, or a plurality of these vanes can be fitted around the aft end of the gas generator and suitable openings drilled or provided within the aft portion of the casing in such a manner as to permit the gases escaping from the combustion chamber 44 to impinge on the external vanes, thereby causing rotation of the rocket motor. Where such other devices are used to impart rotation, the orifices 50 need not be canted, but can instead be radially aligned with the longitudinal axis of the generator. This aft end of the gas generator can also be provided with one or more suitable igniter devices 51, which are similar to the igniter device 26 of FIGURE 1. The combustion chamber 44 is loaded with a solid propellant charge 52, the particular charge illustrated in FIGURES 3 and 4 being of the internal-external burning type by reason of the internal burning surface 54 defining axial passage 53 and the outer cylindrical exposed burning surface 55. To restrict the ignition and burning of the propellant material to the exposed surfaces 54, 55, both ends of the charge can be covered with suitable restricting material 56, such as that described hereinbefore. Charge 52 can be supported in any suitable manner within combustion chamber 44; for example, a plurality of sponge rubber strips 57 can be adhesively bonded to the outer cylindrical surface 55 of the charge and the inner wall of the adjacent casing 42.

Referring now to the embodiment illustrated in FIGURES 6 and 7, gas generator 61 has some features common to those gas generators illustrated in FIGURES 1 and 3. Casing 62 is internally divided by a movable piston 16 into an agriculutral chemical compartment 13 and a combustion chamber 14. Disposed within compartment 13 is a flexible bag 63, made of rubber, plastic, or the like, which is adapted to contain a desired agricultural chemical. Bag 63 is sealed about filler plug 49 and to the inlet ends of one or more manifolds or pipes 64 which extend outwardly from the compartment 13 back down along the outer surface of casing 62, these pipes 64 being provided with a plurality of normally closed openings, orifices, or nozzles 66 which are adapted to break open or otherwise fail and spray the agricultural agent supplied from bag 63 when the bag is compressed due to the forward movement of piston 16 when gases are generated within combustion chamber 14. These orifices 64 all open in the same rotary direction so that when the agricultural treating agents are sprayed therefrom, rotation is imparted to the generator. Alternatively, the nozzle 18 can be provided with vanes like that in FIGURE 1 to augment the rotational force imparted by the sprayed treating agent. The chamber 14 is loaded or provided with a charge of solid propellant 66, the particular charge illustrated in the drawing being in some respects similar to charge 29 of FIGURE 1 in that its external surface is restricted by means of restricting material 33 and case bonded to the casing 62. Charge 66, however, has an axial perforation 67 which is star-shaped in cross section, the axial perforation being defined by an exposed burning surface 68, the perforation having a plurality of star points.

It should be evident that any of the aforementioned charges of solid propellant can be substituted in any of the gas generators. The geometry of such charges can vary and can be of the internal, external, or internal-external burning type. Where an axial perforation is used, it can have any cross-sectional configuration, such as circular, star-shaped, or the like. Similarly, any of the igniter devices can be substituted for any of those shown in the various described gas generators and can be disposed at any point within the combustion chamber. The zone or compartment containing the sprayable agricultural treating agent can be defined by the gas generator casing or a suitable flexible bag which is connected to the spraying nozzles or orifices, such as illustrated in FIGURE 5. These gas generators can be launched from any suitable launching equipment, such as that used by the military to launch military rockets, and aimed so as to fly over the land desired to be treated at a suitable altitude. The rotation of the spraying devices of this invention causes their stabilized flight, as well as imparting centrifugal force to the agricultural treating agent so as to aid its ejection.

In operation of the gas generator shown in FIGURE 1, upon closing a suitable switch in an external power source, electric current flows to the electro-responsive means of the igniter device 26, causing the ignition and subsequent burning of the ignition material in the frangible cup 27. As a result, the hot ignition products rupture or otherwise break the frangible igniter cup 27 and immediately propagate throughout combustion chamber 14. The heat from these ignition products is transferred to the exposed burning surface 32 raising the surface to an ignition temperature and causing the subsequent burning and consumption of the propellant charge. When a suitable predetermined working pressure is attained within combustion chamber 14, the gases in combustion chamber 14 escape via passage 21 at a high velocity and impinge on vanes 25, thereby imparting thrust and rotation to the gas generator 11 causing its flight or predetermined trajectory over the area desired to be treated with the agriculutral chemical. As the gas generator 11 flies through the air at a high velocity, the gases within combustion chamber 14 act upon piston 16, causing the latter to move forwardly toward the head end of the gas generator. As a result, the piston exerts a pressure on the fluid agricultural agent contained within compartment 13 and causes it to be forced or sprayed through nozzle 24 during the flight of the gas generator.

In the operation of the gas generator 41, illustrated in FIGURE 3, the igniter device 51 is similarly fired and the burning of the propellant charge 52 takes place on exposed surfaces 54 and 55. After starter disc 22 fails, the combustion gases escape through reaction nozzle 18, imparting thrust to the gas generator. The gases also enter compartment 43, causing the agricultural agent therein to be ejected through orifices 50, causing the centrifugal force developed by the rotation augmenting the pressure exerted by the gases to aid in ejecting the agricultural agent.

In the operation of the gas generator 61, illustrated in FIGURE 6, the igniter device 51 functions in a similar manner and the ignition of the propellant charge 66 initially takes place on the exposed burning surface 68. After the failure of the starter disc 22, the gases within combustion chamber 14 escape at a high velocity through the now open nozzle passage 21, thereby imparting thrust to the gas generator and initiating its flight over the land desired to be treated with the agricultural treating agent contained within bag 63. During this flight, the piston 16 moves forward, as in FIGURE 1 and exerts a pressure on the bag 63 causing the agricultural treating agent contained within this bag to be ejected via manifolds 64 and orifices 66 into the air as the gas generator flies over the land desired to be treated, the ejection of the agricultural agent imparting rotation to the generator with the consequent centrifugal force developed also aiding this ejection.

The solid propellant material which can be employed in fabricating the gas generator charges useful in this invention include any of those known in the art, which propellant materials are self-combustible, slow burning, nonexplosive, and generate large volumes of gases which can be utilized to propel the spraying device. Such propellant charges include those useful in various rocket motors, such as those useful in assisting the take-off of aircraft, and the like. Representative solid propellants useful in this invention include those of the double base type, such as ballistite type, a solid nitroglycerin-nitrocellulose double base propellant. Another example of a double base propellant is cordite, which consists of nitroglycerin, nitrocellulose and carbamite (diethyl diphenyl urea). Other useful propellants include those of the composite type comprising a major amount of a solid inorganic oxidizing salt and a minor amount of an organic binder which serves as the fuel for the oxidizer. Such inorganic oxidizing salts include the ammonium, alkali metal, and alkaline earth metal salts of nitric, chloric, and perchloric acids, such as ammonium perchlorate, potassium perchlorate, ammonium nitrate, lithium perchlorate, potassium nitrate, and the like. Suitable binder materials which can be used in fabricating these composite propellants include natural and synthetic rubbers, asphalt, cellulose and derivatives thereof, and polymers of acrylic, epoxy, phenolic, and like materials, polyamides, polyesters, polyethylene polysulfides, polyurethanes, and the like. An example of a known composite solid propellant is Galcit, which consists of finely divided potassium perchlorate in asphalt and oil. These propellants can be cast, compression molded, or extruded into the desired shape or geometry. After shaping the propellant, it can then be cured so as to set up into a relatively rigid mass which can be machined or otherwise finished to the desired shape.

The agricultural treating agents which can be used in this invention include fluid compositions which form sprays when forced through small openings or orifices. They can be liquids, gases, finely divided solids or liquid suspensions or solutions of solids, and gases, mists or fogs. Representative agricultural treating agents include fungicides, insecticides, defoliants, fertilizers, repellents, herbicides, and the like, having sufficient density to settle to the ground when sprayed from the flying gas generators of this invention.

Although I prefer to use solid propellants to impart thrust to the spraying devices of this invention and furnish the gases necessary to exert pressure on the agricultural treating agent, I can also use liquid propellants, including liquid monopropellants such as nitromethane, diethylene glycol dinitrate, ethylene diamine, hexanitroethane, and the like, and liquid bipropellants such as red fuming nitric acid and aniline, liquid oxygen and methanol, hydrogen peroxide and kerosene, and the like. These liquid propellants can be fed under pressure from tanks to the combustion chamber where they are burned, the combustion gases being utilized to provide thrust and pressure for ejecting the fluid agricultural treating agent.

Various modifications and alterations of this invention will become apparent to those skilled in the art without departing from the scope and spirit of this invention, and it is to be understood that the foregoing discussion and accompanying drawing merely illustrate preferred embodiments of this invention which should not be construed as to unduly limiting the invention.

I claim:

1. A jet propelled spraying device comprising a casing, means dividing said casing into a propulsion reaction chamber and a fluid-containing chamber adapted to contain a sprayable fluid agricultural treating agent, a self-combustible, gas-generating solid propellant charge loaded within said reaction chamber, a reaction nozzle secured to the aft end of said reaction chamber, spray means communicating with said fluid-containing chamber, and means adapted to permit combustion gases generated by said propellant in said reaction chamber to exert superatmospheric pressure upon said agricultural treating agent in said fluid-containing chamber and force the said agent through said spray means.

2. The jet propelled spraying device of claim 1, wherein said means dividing said casing comprises a piston adapted to move toward the head end of said casing as a result of the pressure exerted thereon by said combustion gases.

3. The jet propelled spraying device of claim 2, wherein said agricultural treating agent is contained within a compressible container disposed in said fluid-tight chamber, said compressible container being in sealed communication with said spray means and adapted to be compressed by said gases.

4. The jet propelled spraying device of claim 3, wherein said spray means comprises a plurality of conduits secured to said casing and extending back along the exterior of the same, said conduits having a plurality of spray orifices therein oriented in the same rotary direction.

5. The jet propelled spraying device of claim 1, wherein said means dividing said casing comprises a stationary partition having check valve means adapted to permit said combustion gases to flow into said fluid-tight chamber.

6. The jet propelled spraying device of claim 5, wherein said spray means comprises a plurality of orifice means which are adapted to spray said agricultural treating agent, and said orifice means having opening oriented in the same rotary direction.

7. The jet propelled spraying device of claim 1, wherein said propellant is a solid propellant charge that is cylindrical in shape and has an axial perforation defined by an exposed burning surface.

8. The jet propelled spraying device of claim 7, wherein said perforation is circular in vertical cross section.

9. The jet propelled spraying device of claim 7, wherein said perforation is star-shaped in cross section and said charge has its outer cylindrical surface and ends restricted.

10. A jet propelled spraying device comprising a casing, a piston dividing said casing into a combustion chamber and a fluid-containing chamber adapted to contain a sprayable fluid agricultural treating agent, a solid propellant charge loaded in said combustion chamber, said charge having an axial perforation defined by an exposed burning surface, a reaction nozzle secured to the aft end of said casing and communicating with said combustion chamber via a converging-diverging passage, a plurality of vanes longitudinally mounted within said passage at an angle with respect to the axis of said spraying device, and normally closed nozzle means in the head of said casing and communicating with said fluid-containing chamber.

11. A jet propelled spraying device comprising a casing, a stationary partition dividing said casing into a combustion chamber and a fluid-containing chamber adapted to contain a sprayable fluid agricultural treating agent, check valve means adapted to permit combustion gases from said combustion chamber to enter said fluid-containing chamber, a solid propellant charge loaded in said combustion chamber, said charge having an axial perforation defined by an exposed burning surface, a reaction nozzle secured to the aft end of said casing and communicating with said combustion chamber via a converging-diverging passage, and a plurality of circumferentially spaced normally closed orifice means in said casing communicating with said fluid-containing chamber, said orifice means having orifice passages therein tangentially aligned with respect to said casing.

12. A jet propelled spraying device comprising a casing, a piston dividing said casing into a combustion chamber and a fluid containing chamber, a compressible bag within said last-mentioned chamber and adapted to contain a fluid agricultural treating agent, a solid propellant charge loaded in said combustion chamber, said charge having an axial perforation defined by an exposed burning surface, a reaction nozzle secured to the aft end of said casing and communicating with said combustion chamber via a converging-diverging passage, and manifold means mounted on the outside of said casing and communicating with said compressible bag, said manifold means having a plurality of normally closed orifices therein opening in the same rotary direction.

13. A method of spraying a fluid agricultural treating agent from the air, which comprises launching a gas generator containing propellant and said agricultural treating agent, passing combustion gases from said generator in such a manner as to impart thrust thereto and propel said generator over said area desired to be treated with said agricultural treating agent, and utilizing said gases to exert pressure on said agricultural treating agent contained within said generator and spray the same therefrom as said generator flies over said desired area.

14. A method of spraying a fluid agricultural treating agent from the air, which comprises launching a gas generator containing solid propellant and said treating agent, passing combustion gases from said generator in such a manner as to impart thrust thereto and propel said generator over said area desired to be treated with said agricultural treating agent, and utilizing said gases to exert pressure on said agricultural treating agent contained within said generator and spray the same therefrom in such a manner as to cause rotation of said generator as it flies over said desired area.

References Cited in the file of this patent

UNITED STATES PATENTS

| | | |
|---|---|---|
| 1,994,201 | Wharton | Jan. 23, 1934 |
| 2,753,801 | Cumming | July 10, 1956 |
| 2,772,922 | Boyd et al. | Dec. 4, 1956 |
| 2,854,925 | Crockford et al. | Oct. 7, 1958 |
| 2,868,127 | Fox | Jan. 13, 1959 |

FOREIGN PATENTS

| | | |
|---|---|---|
| 688,563 | Great Britain | Mar. 11, 1953 |
| 777,970 | France | Mar. 6, 1935 |
| 1,046,624 | France | Dec. 8, 1953 |